United States Patent [19]

Fyfe et al.

[11] Patent Number: 4,527,618
[45] Date of Patent: Jul. 9, 1985

[54] SOLAR ENERGY STORAGE AND DISTRIBUTION SYSTEM WITH HEAT PUMP ASSIST

[75] Inventors: Donald W. Fyfe; Franklin S. Hoyt, both of Hollis, N.H.

[73] Assignee: Solar Decisions, Inc., Hollis, N.H.

[21] Appl. No.: 427,465

[22] Filed: Sep. 29, 1982

[51] Int. Cl.³ .............................................. F24D 11/02
[52] U.S. Cl. .................................... 165/18; 165/48 S; 62/238.6; 126/437; 237/2 B
[58] Field of Search ............... 237/2 B; 126/435, 437; 62/235.1, 238.6; 165/45, 48 S, 18

[56] References Cited

U.S. PATENT DOCUMENTS

| | | | |
|---|---|---|---|
| 2,575,478 | 11/1951 | Wilson | 126/435 X |
| 3,888,303 | 6/1976 | Skala | 165/2 |
| 3,980,130 | 9/1976 | Thomason et al. | 165/18 |
| 3,993,929 | 10/1976 | Thomason et al. | 165/18 |
| 3,996,759 | 12/1976 | Meckler | 62/2 |
| 4,012,920 | 3/1977 | Kirschbaum | 62/235.1 |
| 4,054,124 | 10/1977 | Knoos | 126/435 X |
| 4,096,861 | 6/1978 | Bowles | 126/271 |
| 4,111,259 | 9/1978 | Lebduska | 237/1 A |
| 4,128,124 | 12/1978 | Worthington | 126/435 X |
| 4,143,642 | 3/1979 | Beaulieu | 237/2 B X |
| 4,143,814 | 3/1979 | Hill, Jr. | 237/1 A |
| 4,169,554 | 10/1979 | Camp | 126/427 |
| 4,182,409 | 1/1980 | Robinson, Jr. | 165/104 |
| 4,231,352 | 11/1980 | Bowden et al. | 126/422 |
| 4,237,859 | 12/1980 | Goettl | 126/437 X |
| 4,237,964 | 12/1980 | Larue et al. | 165/1 |
| 4,246,956 | 1/1981 | Drucker | 165/29 |
| 4,248,049 | 2/1981 | Briley | 165/45 X |
| 4,291,674 | 9/1981 | Comte et al. | 126/437 X |
| 4,291,756 | 9/1981 | Bracht | 165/104 |
| 4,294,227 | 10/1981 | Kreibich et al. | 126/400 |
| 4,374,467 | 2/1983 | Briley | 62/235.1 X |

FOREIGN PATENT DOCUMENTS

| | | | |
|---|---|---|---|
| 2749714 | 5/1979 | Fed. Rep. of Germany | 126/437 |
| 2405443 | 6/1979 | France | 126/437 |
| 25641 | 3/1981 | Japan | 126/437 |

Primary Examiner—Albert W. Davis, Jr.
Assistant Examiner—Peggy A. Neils

[57] ABSTRACT

A thermal energy storage and transfer system includes solar energy collector means disposed to receive incident solar energy, thermal energy exchange means disposed in a utilization area, three water storage tanks, one of which is at least three times larger than the other two storage tanks. Water is selectively circulated through a first circulation loop between the solar collector and one small tank for transferring solar energy from the collector; through a second circulation loop between the second small tank and the utilization area; and through a third circulation loop between the large tank and the two smaller tanks. A heat pump is coupled between the two smaller storage tanks for transferring thermal energy between those two tanks. The ever varying demand/supply ratio associated with available solar energy and the demands in the utilization area are accommodated by switching the storage system as a function of the sensed enthalpy—the integrated effect of the varying demand/supply ratio—of the storage system.

23 Claims, 9 Drawing Figures

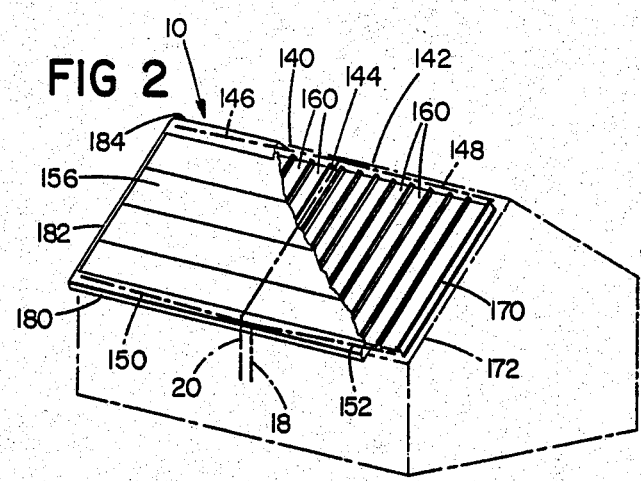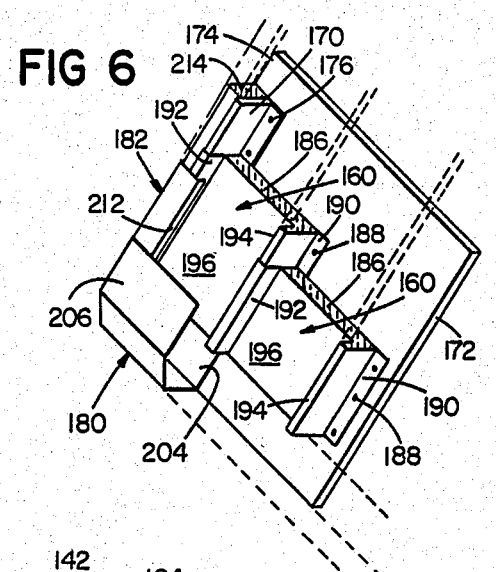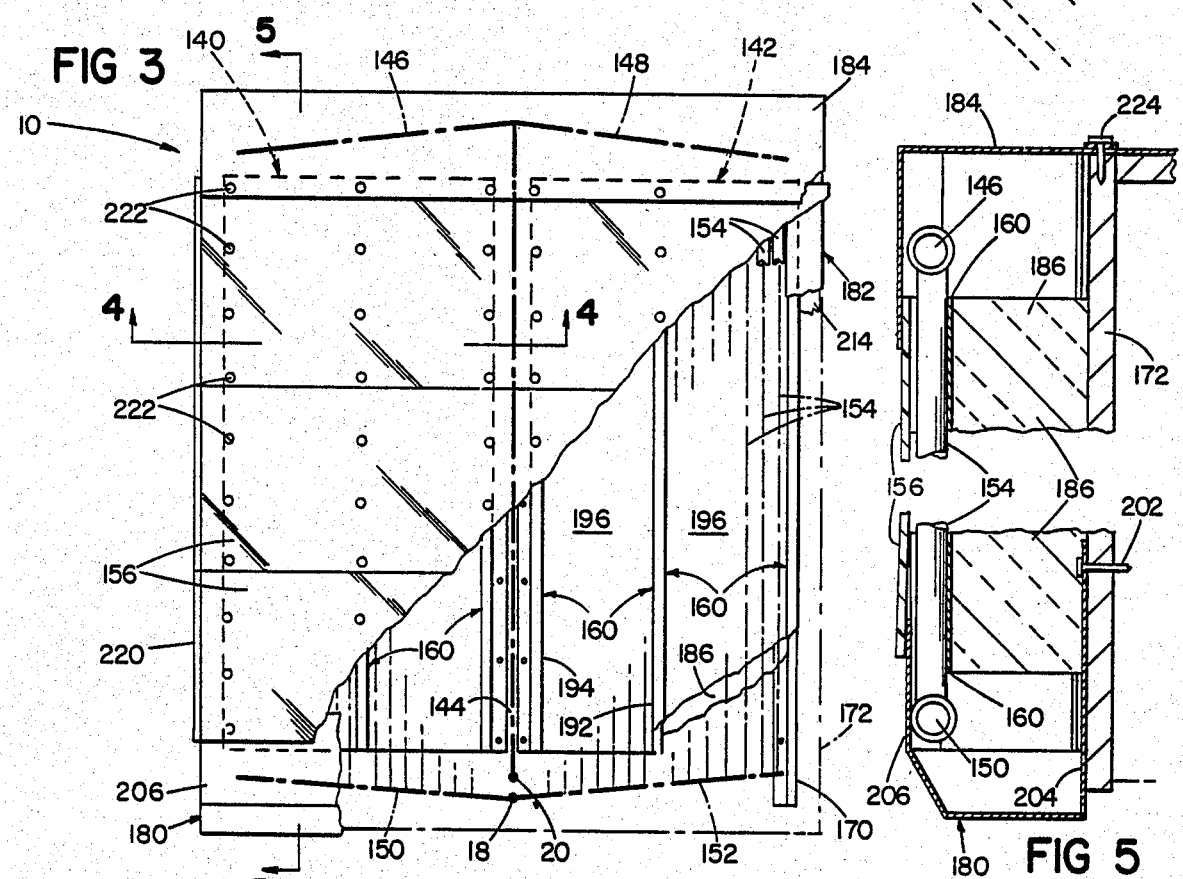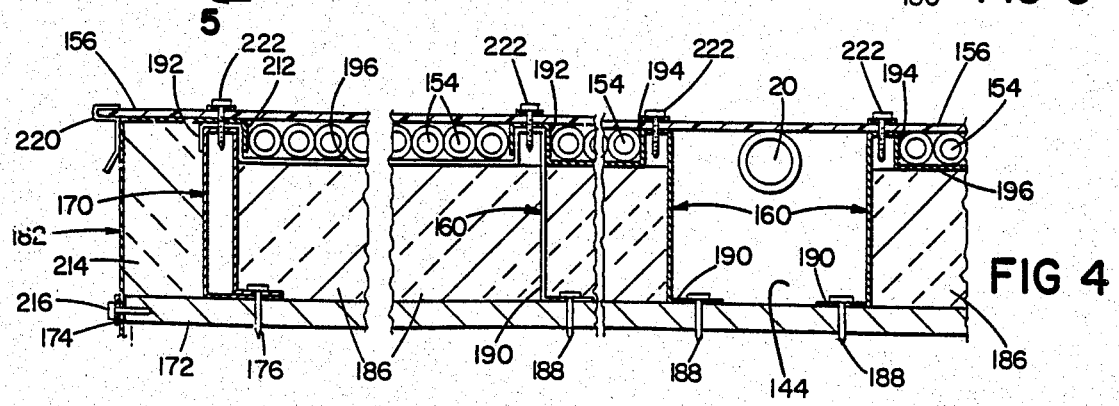

SOLAR ENERGY STORAGE AND DISTRIBUTION SYSTEM WITH HEAT PUMP ASSIST

BACKGROUND OF THE INVENTION

This invention relates to thermal energy storage and transfer systems and more particularly to systems that include solar energy collector means disposed to receive incident solar energy and that are adapted for applications such as space heating, domestic hot water, air conditioning, and other similar applications.

Numerous solar energy collection and transfer systems have been proposed. However, the effectiveness of such systems when combined with heat pump technology systems has been limited due to the interconnection relationships between the heat pump and energy storage components of such systems. An object of this invention is to provide improved thermal energy storage and transfer systems of the type that include solar energy collector means.

SUMMARY OF THE INVENTION

In accordance with one aspect of the invention, there is provided a thermal energy storage and transfer system that includes solar energy collector means disposed to receive incident solar energy, thermal energy exchange means disposed in a utilization area, first fluid storage means, second fluid storage means, and interim fluid storage means of larger (preferably at least three times larger) capacity than either said first or second storage means. A first fluid circulation loop includes first circulating means to circulate fluid through the first loop between the solar collector means and the first storage means for transferring solar energy to the fluid and storing the fluid with the transferred thermal energy in the first fluid storage means, a second fluid circulation loop includes second circulating means to circulate fluid through the second loop between the thermal energy exchange means and the second storage means for transferring thermal energy stored in the second fluid storage means to the thermal energy exchange means, and third circulating means to circulate fluid between the interim fluid storage means and the first and second storage means for transferring thermal energy between the first, second and interim fluid storage means. Heat pump means is coupled to the first and second storage means for transferring thermal energy between the first and second storage means.

A multi-mode storage system in accordance with this aspect of the invention provides synchronized heat pumping and/or mass flow transport of energy from an incoming energy storage (collection) tank to an outgoing energy storage (distribution) tank with thermal coupling and decoupling of a larger interim storage tank to either or both of the aforementioned tanks. Temperature sensors with solid state switches or thermostats are used for thermal switching to accomplish the synchronized heat pumping and mass flow transport of thermal energy. In one embodiment, the mass flow transport of thermal energy is accomplished by pumps and check valves, if the stored medium is liquid, or fans and dampers if the medium is gas. Motorized or solenoid valves may be used instead of check valves. Mass flow is supplied from the larger interim tank to either or both the smaller incoming energy and outgoing energy tanks, and is returned to the interim tank by gravitational cascade flow.

In a particular solar space and domestic hot water heating embodiment, the system has four modes that progress from a condition of no available solar energy to one of an abundance of solar energy.:

Mode I (Back-up) (No solar energy available): The large interim tank is coupled to the small supply tank and provides a large thermal capacity at low temperature for maximizing solar collection when solar energy is available. The small load tank is isolated for minimizing the input of back-up energy.

Mode II (Daily output tends to exceed daily solar input): The large interim tank is coupled to the small supply tank for heat pumping solar energy to the small load tank. This mode enhances collection during intervals of low-level radiation and provides a high coefficient of heat pump performance during intervals of high level radiation.

Mode III (Daily output equals daily solar input): The large interim tank is coupled to the small load tank and the small supply tank is isolated for heat pumping solar energy to the coupled tanks. This mode provides an optimum balance for high solar collection yield and a high heat pump coefficient of performance.

Mode IV (Daily solar input exceeds daily output): All tanks are coupled together to provide maximum storage for "ready to use" solar energy. Heat pumping is terminated when its use would be superfluous and wasteful of energy.

Back-up heat may be superimposed into any mode if quick reaction capability is required.

In another embodiment, a heat recovery system evolves into three modes that progress from a condition of no recoverable heat available to a condition of abundance of recoverable heat:

Mode I (Back-up): Small load tank is isolated to minimize the input of back-up heat.

Mode II (Daily output tends to exceed the daily recoverable heat): The large interim tank is coupled to the small supply tank for heat pumping to the samll load tank. The large thermal capacity of the coupled tanks is kept at low temperatures for a high recovery yield.

Mode III (Recoverable heat tends to exceed output needs): The large interim tank is coupled to the small load tank to provide maximum storage for "ready to use" recovered heat.

An air-conditioning embodiment evolves into two modes that progress from low to high ambient temperature change:

Mode I (low ambient operation): The large interim tank is coupled to the small (cold) supply tank to provide a maximum extraction of stored thermal energy when low ambient conditions exist.

Mode II (High ambient operation): The large interim tank is coupled to the small (warm) load tank to provide thermal capacity for absorbing high heat flow when high ambient conditions exist.

A major factor in solar energy collection for space heat or domestic hot water has been the cost of the collector. Among the cost elements of collectors are: (1) the high fabrication cost per square foot of the collector plate; (2) low effective collector area obtained for inappropriately-sized or -shaped collection base area, because of fixed-dimension pre-fab collector assemblies; and (3) high installation cost of rigging and fixing the collector plates to a roof and interconnecting them, to provide an array of sufficient capacity for space heat and domestic hot water applications. Typically, collector costs (including installation) have averaged between $20 and $40 per square foot, depending on the type, collector area, efficiency, and installation difficulty.

Costs in that range have prevented mass application of solar collection, storage and transfer techniques because the financial pay-back has been too long and the return too low, except in special cases.

In accordance with another aspect of the invention, there is provided a collector system which minimizes or combines construction and installation elements, reduces installed cost and maximizes effective collector area per square foot of available collector base area. In that collector system, pre-formed trays of aluminum or other material which can stand temperatures to 350 degrees F., overlap and interlock with each other, to provide a base to support collector tubes (for liquid) or absorption surface media (for air). Trays are typically formed in 8-foot or 10-foot lengths from sheet stock or roll-formed from continuous rolls of stock sizes and cut to standard lengths. The trays are two feet in width and are installed from eave to ridge. A stringer is nailed to each gable edge of the collector, to "catch" the first rank of trays. The trays are nailed down after inserting high-temperature, low-volatile fiberglass furnace insulation under the length of each tray in the cavity left between the tray and the roof or substrate. The trays do not extend to the extreme edges of the eaves or the ridge, but are cut to leave ample room for the collector headers plus their insulation so that they may be pitched at 2% to provide rapid draining of the collector when the system is shut down. The area and capacity of the collector system is easily adjusted as required for particular installations.

Other features and advantages of the invention will be seen from the following detailed description of a particular embodiment, in conjunction with the drawings, in which:

BRIEF DESCRIPTION OF THE DRAWINGS

FIG. 2 is a perspective view of a solar collector structure for use with the system shown in FIG. 1;

FIG. 3 is a plan view (with parts broken away) of a solar collector system of the type shown in FIG. 2;

FIGS. 4 and 5 are sectional views taken generally along the lines 4—4 and 5—5 respectively of FIG. 3 of portions of the solar collector system;

FIG. 6 is a diagrammatic perspective view of a corner portion of the solar collector structure of FIG. 2;

DESCRIPTION OF PARTICULAR EMBODIMENT

Figure 1:
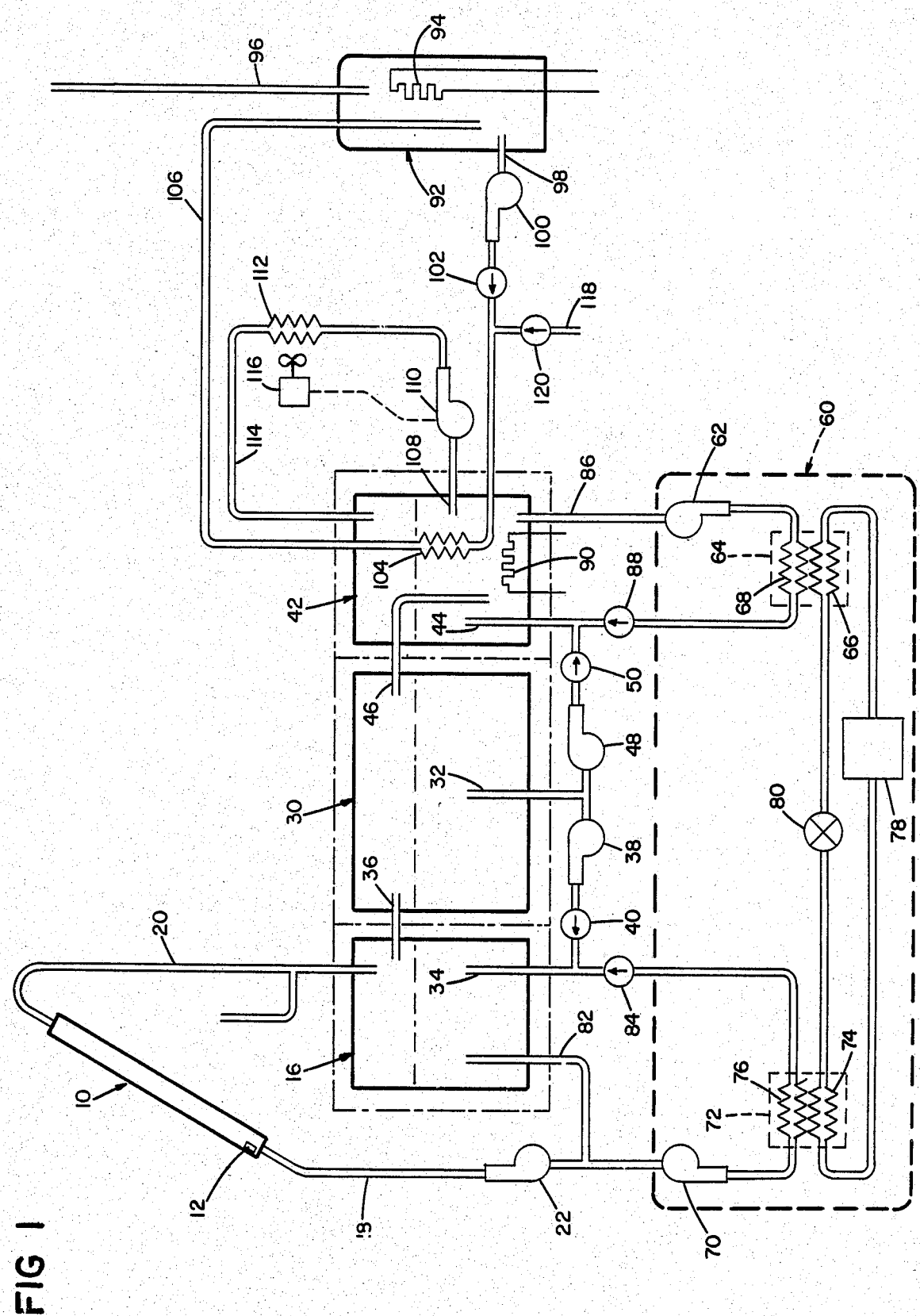
FIG. 1 is a schematic diagram of an energy collection, storage, and distribution system in accordance with the invention.

With reference to FIG. 1, the system includes a roof mounted solar collector 10 with associated temperature sensor 12. Collector 10 has about three hundred fifty square feet of area and collector sensor 12 can be a conventional device that operates on a temperature differential between the temperature of the water in the collection tank 16 and the temperature of solar collector 10. Collector 10 is connected to an insulated collection storage tank 16 of approximately one hundred fifty gallons capacity by a circulation loop that includes riser 18 and return 20. Pump 22 circulates water through the loop from tank 16 through collector 10 at a rate of about thirty gallons per minute.

An insulated main storage tank 30 of approximately seven hundred gallons capacity is located adjacent to the collection tank 16 and tanks 16, 30 are interconnected for mass flow circulation by a circulation loop that includes conduits 32, 34, 36, pump 38 and check valve 40. An insulated distribution storage tank 42 of approximately one hundred fifty gallons capacity is interconnected with main tank 30 by a mass flow circulation loop that includes conduits 32, 44 and 46, pump 48 and check valve 50.

Heat pump apparatus 60 includes condensor pump 62; heat exchanger 64 that includes condensor coil 66 and heated water coil 68; evaporator pump 70; a second heat exchanger 72 that includes evaporator coil 74 and water coil 76; refrigeration compressor 78 that has a nominal cooling capacity of 36,000 BTU/hour; and expansion valve 80. Evaporator pump 70 circulates water from collection tank 16 through a circuit that includes inlet conduit 82, coil 76, check valve 84 and conduit 34; while condensor pump 62 circulates water from distribution tank 42 from inlet conduit 86, through heat exchanger coil 68, and check valve 88 to conduit 44.

An auxiliary or back-up heater 90 in the distribution tank 42 includes two resistance coils of conventional domestic hot water heating type. A domestic hot water supply includes a forty (or eighty) gallon tank 92 with conventional hot water boost coils 94 of the quick recovery type and outlet pipe 96. A circulation loop between domestic hot water tank 92 and distribution tank 42 includes inlet conduit 98, circulation pump 100, check valve 102, exchanger coil 104, and return conduit 106. A space heater circuit connected to distribution tank 42 includes inlet conduit 108, pump 110, exchanger coil 112, and return conduit 114. An air circulation system for space heating includes fan 116 that cooperates with exchanger 112 for circulating room air. The circulation pumps 38, 48, 62, 70, 100 and 110 are each of about ten gallons per minute capacity. Makeup water is supplied to the domestic hot water circulation loop through inlet 118 and check valve 120.

Further details of the solar collector 10 may be seen with reference to FIGS. 2-6. In a typical domestic installation, collector 10 is sized to provide about one square foot of effective collection area per eight square feet of floor area, the collection area being adjusted based on internal factors such as expected passive solar gain, height of ceilings, insulation level for the heated areas, expected hot water requirements, and desired reserve capacity, as well as external factors such as the latitude of installation, available collector base area, angle of the collector from the vertical, bearing of the collector off south, and shadow patterns from trees or buildings. The overall size of the collector 10 shown in FIG. 2 is approximately fifteen feet by twenty-five feet and the collector consists of two sections 140, 142, each about twelve feet wide with a center channel 144 for the return 20 from the two top headers 146, 148. Bottom headers 150, 152 are connected to riser 18, and each header is pitched at a two degree angle to allow the system to drain quickly and to equalize the flow rates. Tubes 154 (FIGS. 3-5) extend between the top and bottom headers. Glazing material 156 (Filon or other reinforced plastic sheets may be used), is laid in horizontal courses overlapped by three-quarter inch and secured together by "Z" shaped stainless steel strips.

The collector tubes 154 are disposed in tray structures 160, details of which may be seen with reference to FIGS. 3-6. FIG. 3 shows a collector assembly with four tray structures 160; FIG. 4 shows portions of three tray structures, two of section 140 and one of section 142; FIG. 5 shows portions of the upper and lower ends of a collector assembly including a tube 154; and FIG. 6 shows a corner of the solar collector structure with portions broken away. Principal components of each collector section 140, 142 are formed of 0.032 inch sheet aluminum and include a starter stringer 170 (at the outer end of each collector unit); a series of interlocked tray units 160; bottom box member 180; side box sections 182; and cap 184. Each stringer 170 is secured to roof 172 about four inches from the gable end 174 by nails 176. Each tray unit 160 has a center to center width of two feet between box rail (ridge) portions 192, 194; the tray surface 196 is one and one quarter inch below the top of rail portions 192, 194; and a tray flange 190 extends along one edge of each unit about four inches below surface 196. Batts 186 of insulation (four inches thick and two feet wide) are spaced along the roof and tray units 160 are dropped over the batts 186, with the rail portion 192 of each outer tray over its starter stringer 170 and rail portion 192 of all the other trays nested over the rail 194 of the adjacent tray. Each tray is secured with nails 188 that are driven through tray flanges 190.

At the lower end of the collector unit there is a bottom box member 180 that is secured to roof substrate 172 by fasteners 202 and that has a base 204 that underlies the ends of tray members 160 and an upper surface portion 206 that overlies the ridges 192, 194 of the trays 160.

Aluminum side box sections 182 extend along the sides of the gable ends and have flanges 212 which overlap and interlock onto the adjacent first tray unit 160 at each gable end and provide a space for a four inch insulation batt 214 and are secured with fasteners 216.

Collector tubes 154 are laid in the tray units 160 with attached headers (Solaroll header and tube system), the tubes 154 being secured to the tray surfaces 196 with a high temperature contact adhesive. The return 20 is located in the center section 144 between the center two trays 160. The headers and connecting pipes 18, 20 may be of copper or high temperature polyvinylchloride and interconnected with radiator hose and clamps. The headers are adjusted for pitch with copper wire hangers and insulated. Typically, one and one-half inch copper or CPVC pipe is used for the riser 18, the return 20 and the headers 146, 148, 150 and 152 for a collector area of up to four hundred square feet.

After the collector tubes and headers are installed in the tray units 160, glazing 156, in sheet form and in three foot or four foot wide rolls, is laid horizontally across the tray ridges 192, 194 and trimmed at the gable ends with shears before applying the drip edges 220. The horizontal courses of glazing 156 are overlapped about three quarter inch and secured together with Z shaped stainless steel strips, providing weatherproof joints and horizontal stiffening. The glazing material is fastened to the ridges 192, 194 with self-tapping aluminum screws 222 that carry Teflon washers, thereby locking the entire system together. The edges of the glazing 156 are not fastened until all the glazing courses are in place, at which time the glazing edges are trimmed. Their drip edges 220 are then slid under the glazing edges and secured with self-tapping aluminum screws. Finally the ridge cap 184 is installed with self-tapping screws 222, 224 as indicated in FIGS. 3 and 5.

The resulting collector assembly consists of a system of tray units 160 and glazing sheets 156 which provides (a) support for the solar collector tubes 154 (or base for the solar air heating channel), (b) support for the glazing material 156, (c) stand-off from roof 172 or substrate for insulation for optimum collector efficiency and to protect the roof or substrate from high collector temperatures during summer. The glazing 156 is flexible and accomodates surfaces which are not "true". The system provides self-spacing, interlocking arrangements which utilizes standard components. The system of tray units and glazing may be substituted for the weatherproof roof surface in a new home installation, thus avoiding roofing and insulation costs for that portion of the roof covered by the collector system on such a house.

Figure 7:
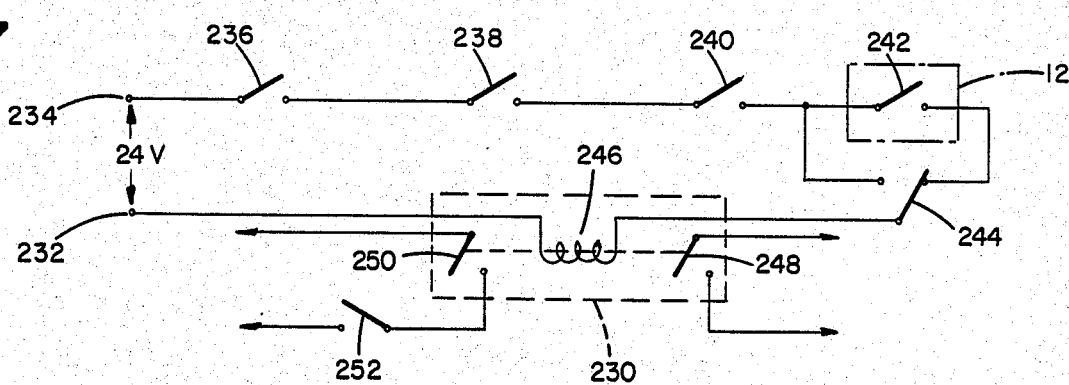
FIGS. 7 and 8 are schematic diagrams of control circuitry used with the solar collector structure of FIG. 1.

The solar collector circulation control circuit shown in the schematic diagram of FIG. 7 controls the operating relay 230 for the solar collector circulating pump 22 and circulation pump 38. Twenty-four volt power at terminals 232, 234 is applied to a series circuit that includes system on-off switch 236, freeze protection switch 238 (that opens when the ambient (external air) temperature is below 40° F.), high temperature protection switch 240 (that opens when the temperature of water in tank 16 is above 160° F.), a parallel circuit of collector control switch 242 (that closes when solar energy is available—and which may be a conventional solar collector circulator control device) and manual-auto mode select switch 244, and relay coil 246 of DPST (Double Pole Single Throw) relay 230. Relay contacts 248 control circulator pump 22 and relay contacts 250 (in series with temperature differential sensor 252—its contacts close when the temperature of collector tank 16 is at least 3° F. greater than the temperature of storage tank 30) control circulator pump 38). Circulator pump 38, when energized, transports thermal energy by mass flow from tank 16 to tank 30, thereby maintaining the temperature of water in tank 16 at a minimum to increase the solar energy collection yield.

Figure 8:
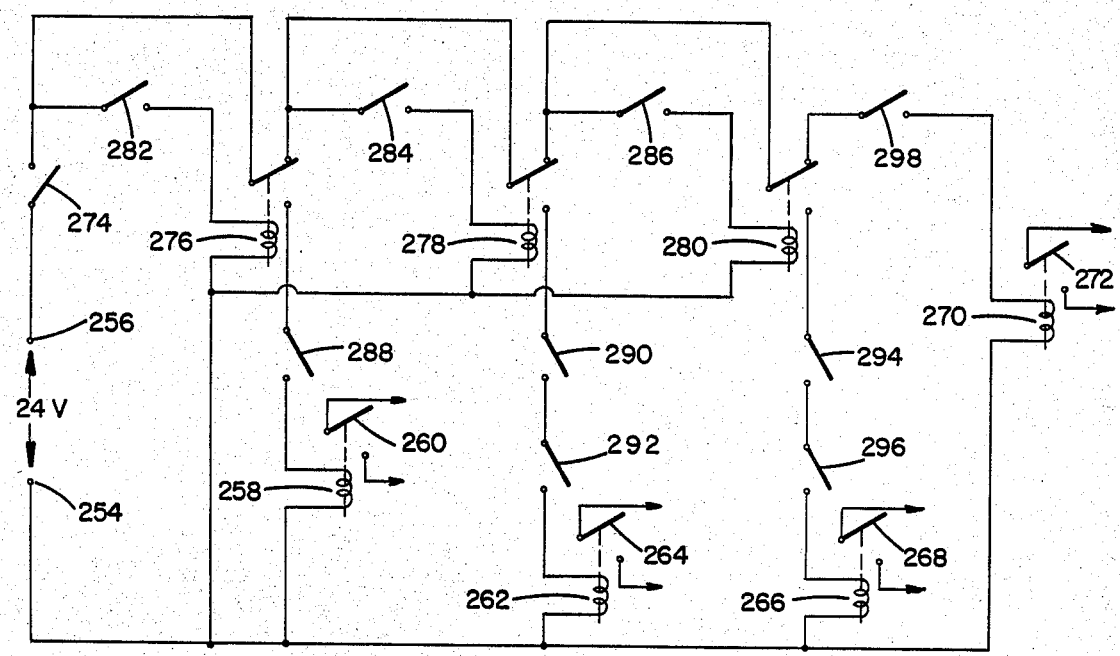

Further aspects of the storage system control are included in the circuit shown in the schematic diagram of FIG. 8. That circuit includes terminals 254, 256 to which 24 volt power is applied; relay coil 258 whose contacts 260 control auxiliary heater 90; relay coil 262 whose contacts 264 control circulator pump 38 and heat pump 60; relay coil 266 whose contacts 268 control circulator pump 48 and heat pump 60; and relay coil 270 whose contacts 272 control circulator pumps 38 and 48. System on-off switch 274 (ganged with switch 236) energizes a mode control circuit that includes three SPDT (Single Pole Double Throw) relays 276, 278, and 280, temperature responsive switches 282, 284, 286, 288, 290, 292, 294, and 296, and temperature differential switch 298 (its contacts close when the temperature of storage tank 30 is at least 3° F. greater than the temperature of distribution tank 42). The tank temperatures to which switches 282–296 respond are indicated in the following table:

| Switch | Tank | Open (°F.) | Close (°F.) |
| --- | --- | --- | --- |
| 282 | 30 | 55 | 45 |
| 284 | 30 | 100 | 90 |
| 286 | 30 | 125 | 105 |
| 288 | 42 | 100 | 90 |
| 290 | 42 | 120 | 90 |
| 292 | 16 | 45 | 55 |
| 294 | 42 | 125 | 90 |
| 296 | 16 | 45 | 55 |

Mode I, Mode II and Mode III control switches 282, 284 and 286 are closed when the water temperature in tank 30 drops to 45° F. When switch 282 is closed, the system is in Mode I and relay 276 is energized such that auxiliary heat relay 258 is in turn energized whenever the temperature of water in distribution tank 42 is less than 90° F. The closed contacts of relay 258 energize heater 90 in distribution tank 42 to heat the water in that tank to 100° F.—an auxiliary or back-up mode energy supply mode. The system remains in this mode until the temperature in tank 30 increases to 55° F. (due to solar energy heating of water in tank 16 and mass transfer of that energy to tank 30 by pump 38). When the temperature of tank 30 reaches 55° F., switch 282 opens, deenergizing relay 276 and applying power to Mode II control switch 284.

When the water temperature in tank 30 rises above 55° F., the system transfers to Mode II and remains there until the water temperature falls below 45° F. or rises to 100° F. In that Mode, relay 278 is energized and heat pump control relay 262 is in turn energized whenever the temperature of water in distribution tank 42 is less than 120° F. (switch 290) and interlock switch 292 (which monitors the temperature of water in collection tank 16) is closed. The closed contacts 264 of relay 262 energize circulation pump 38 and heat pump 60 so that thermal energy from tank 16 is transferred to tank 42 by the heat pump 60, the energy in tank 16 being supplemented to mass flow transfer from tank 30 by pump 38. The system remains in this mode until the temperature in tank 30 increases to 100° F. (due to solar energy heating of water in tank 16 and mass transfer of that energy to tank 30 by pump 38). When the temperature of tank 30 reaches 100° F., switch 284 opens, deenergizing relay 278 and applying power to the closed Mode III switch 286.

When the water temperature in tank 30 rises above 100° F., the system transfers to Mode III and remains there until the water temperature falls below 90° F. or rises to 125° F. In that Mode, relay 280 is energized and heat pump control relay 266 is in turn energized whenever the temperature of water in distribution tank 42 is between 90° F. and 125° F. (switch 294) and interlock switch 296 (which monitors the temperature of water in collection tank 16) is closed. The closed contacts 268 of relay 266 energize circulation pump 48 and heat pump 60 so that thermal energy from tank 16 is transferred to tank 42 by the heat pump 60 and with mass flow energy interchange between tanks 30 and 42 by pump 48. The system remains in this mode until the temperature in tank 30 increases to 125° F. (due to solar energy heating of water in tank 16 and mass transfer of that energy to tank 30 by pump 38 under the control of switch 252). When the temperature of tank 30 reaches 125° F., switch 286 opens, deenergizing relay 280 and applying power to Mode IV switch 298.

In Mode IV, circulation pumps 38 and 48 are energized when the temperature of main tank 30 is above 125° F. and the temperature in tank 42 is 3° F. lower than the temperature in tank 16. The system remains in this mode until the temperature in tank 16 increases to 160° F. (the system maximum) due to solar energy input exceeding the withdrawal of energy from tank 42, at which point switch 240 opens, deenergizing relay 230; or the temperature in tank 30 falls to 105° F., closing switch 286 and transferring the system to Mode III operation.

Figure 9:
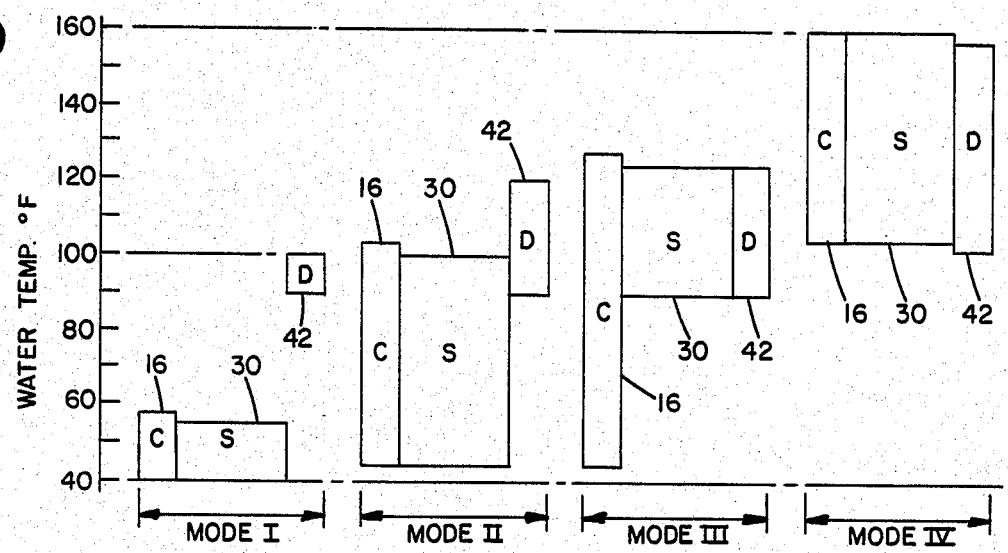
FIG. 9 is a diagram illustrating modes of operation of the system of FIG. 1.

The diagram of FIG. 9 illustrates modes of operation of the system. It will be apparent that the absolute and differential temperature values of the control circuit shown in FIGS. 7 and 8 may be changed depending on requirements of the particular system installation, and are optimally selected to maximize solar energy collection, minimize auxiliary (back-up) thermal input, and optimize the heat pumping modes of operation.

Similarly, it will also be apparent that aspects of the invention may be employed with other solar space heating and domestic hot water heating systems; and that the system may be used for synchronized heat pumping and/or mass flow with tank 30 as an interim storage to transport thermal energy efficiently from collection tank 16 to distribution tank 40 in heat recovery or air conditioning systems. Therefore while a particular embodiment of the invention has been shown and described, it is recognized that various modifications will be apparent to those skilled in the art, and therefore it is not intended that the invention be limited to the disclosed embodiment or to details thereof and departures may be made therefrom within the spirit and scope of the invention.

What is claimed is:

1. A thermal energy storage and transfer system comprising
    solar energy collector means disposed to receive incident solar energy,
    thermal energy exchange means disposed in a utilization area,
    first fluid storage means,
    second fluid storage means,
    first fluid circulation means to circulate fluid between said solar collector means and said first storage means for transferring thermal energy by mass flow from said collector means to said first fluid storage means,
    second fluid circulation means to circulate fluid between said thermal energy exchange means and said second storage means for transferring thermal energy by mass flow from said second fluid storage means to said thermal energy exchange means,
    main fluid storage means of larger capacity that either said first or second storage means,
    third circulation means to circulate fluid between said main fluid storage means and said first and second storage means for transferring thermal energy by mass flow between said first, second and main fluid storage means,
    heat pump means coupled to said first and second storage means for transferring thermal energy between said first and second storage means, said heat pump means including a compressor, an evaporator and a condenser, a cold side fluid circulation loop coupled to one of said fluid storage means, a hot side fluid circulation loop coupled to another of said fluid storage means, cold side heat exchanger means external to said main fluid storage means for transferring heat between said evaporator and said cold side fluid circulation loop, and hot side heat exchange means external to said main fluid storage means for transferring heat between said condenser and said hot side fluid circulation loop, and control circuitry for operating said system in a plurality of modes including a first mode responsive to a relatively low temperature of fluid in said main fluid storage means in which supplemental energy is applied to said thermal energy exchange means during intervals of the absence of solar energy, a second mode responsive to a relatively high temperature of the fluid in said main fluid storage means in which said third circulation means is operated to transfer thermal energy by mass flow between said first, second and main fluid storage means; and a third mode responsive to a temperature of the fluid in said main fluid storage means intermediate said relatively low and relatively high temperatures in which said first and second fluid circulation means and said heat pump means are operated concurrently.

2. The system of claim 1 and further including means to selectively couple said cold side fluid circulation loop to said solar collector fluid circulation loop via said first storage means.

3. The system of claim 1 wherein said solar energy collector means includes a substantially planar radiation recepter adapted to be supported in an inclined position to the path of sunlight, said recepter comprising glazing structure exposed to the solar radiation, a series of tray structures, each said tray structure being formed of sheet material with an interlocking portion that overlaps a cooperating portion of an adjacent tray structure, thermal insulation material below each said tray structure, and thermal transfer media in each said tray structure.

4. The system of claim 3 wherein each said tray structure is an elongated member with a planar base region for receiving fluid transfer conduits, and said interlocking portion includes ridge structure that extends along either side of said base region, ridge structure of one tray overlapping and interlocking with cooperating ridge structure of an adjacent tray.

5. The system of claim 4 wherein said tray structures are arranged in a plurality of groups and further including stringer structure at one edge of each said group of tray structure, each said stringer structure being secured to a substrate and overlapping and interlocking with ridge structure of an adjacent tray structure.

6. The system of claim 3 wherein said glazing structure is in the form of strip material disposed transversely to said elongated tray structures and secured to the ridge structures of said tray structures.

7. The system of claim 4 wherein each said tray structure is of preformed sheet metal, and said thermal transfer media includes a series of parallel fluid transfer conduits in each said tray structure, a first header member interconnecting the lower ends of said conduits, and a second header member connecting the upper ends of said conduits.

8. The system of claim 3 wherein each tray structure is a metal sheet member that has parallel raised margins, one said margin of each said tray structure being in interlocking interengagement with a said margin of an adjacent tray and the other margin of each tray including support flange structure for fastening to a substrate member, each said tray structure defining a recess for receiving thermal insulation material and said thermal transfer media includes an array of parallel conduits within each said tray between said parallel ridges.

9. The system of claim 1 wherein said thermal energy exchange means includes a space heating energy exchanger and a domestic hot water energy exchanger.

10. The system of claim 1 and further including auxiliary heating means disposed in said second fluid storage means for transferring thermal energy to said second fluid storage means in the absence of thermal energy provided by said solar energy collector means in response to incident solar energy.

11. The system of claim 1 and further including control means for actuating said third circulating means in response to a predetermined temperature differential between the fluid in said first storage means and said main storage means.

12. The system of claim 1 wherein said control circuitry has one operating mode responsive to a relatively low temperature of the fluid in said main storage means in which said heat pump means and said third circulation means are operated concurrently to transfer thermal energy from said main storage means via said evaporator, and another operating mode responsive to a relatively high temperature of the fluid in said main storage means in which said heat pump means and said third circulation means are operated concurrently to transfer thermal energy to said main storage means via said condensor.

13. The system of claim 1 wherein said third circulating means includes a first circulation loop and circulation pump for circulating fluid between said first storage means and said main interim storage means and a second circulation loop and circulation pump for circulating fluid between said main storage means and said second storage means.

14. The system of claim 13 wherein the thermal storage capacity of said main fluid storage means is at least three times the capacity of either said first or said second storage means.

15. The system of claim 14 wherein said solar energy collector means includes a plurality of tray structures that support an array of pipes connected in parallel between supply and return headers, each tray structure being a metal sheet member that has parallel raised margins, one said margin of each said tray structure being in interlocking interengagement with a said margin of an adjacent tray and the other margin of each tray including support flange structure for fastening to a substrate member, each said tray structure defining a recess for receiving a thermal insulation material and a plurality of said pipes being disposed in each said tray structure between said parallel ridges.

16. The system of claim 1 and further including means to selectively couple said hot side fluid circulation loop to said second fluid circulation loop via said second storage means.

17. Apparatus for controlling thermal conditions existing in an environmental space comprising solar collecting means for heating a heat transfer fluid with solar energy, main storage means serving as a reservoir for said heat transfer fluid, collection buffer means, distribution buffer means, a first circuit for transferring said heat transfer fluid between said collection buffer means and main storage means, a second circuit for transferring said heat transfer fluid between said main storage means and said distribution buffer means, a heat pump circuit for transferring thermal energy between said collection buffer means and said distribution buffer means, said heat pump circuit including a refrigerant compressor, an evaporator and a condenser, evaporator side fluid circulation means including a heat exchanger external to said main storage means and coupled to said collection buffer means for transferring thermal energy by mass flow between said heat pump evaporation side and said collection buffer means, and condenser side fluid circulation means including a heat exchanger external to said main storage means and coupled to said distribution buffer means for transferring thermal energy by mass flow between said heat pump condenser side and said distribution buffer means, an energy transfer circuit for transferring thermal energy between solar collecting means and said collection buffer means, and circulation control means responsive to sensed temperature values of the fluid in said main storage means for controlling said heat pump circuit and said first and second fluid transfer circuits and operating said system in a plurality of modes including a first mode responsive to a relatively low temperature of fluid in said main storage means in which supplemental energy is applied to said environmental space during intervals of the absence of solar energy; a second mode responsive to a relatively high temperature of the fluid in said main storage means in which said first and second fluid transfer circuits are operated to transfer thermal energy by mass flow between said collection buffer means, said distribution buffer means and said main storage means; and a third mode responsive to a temperature of the fluid in said main storage means intermediate said relatively low and relatively high temperatures in which said first and second fluid transfer circuits and said heat pump circuit are operated concurrently.

18. The system of claim 17 and further including means for transferring heat between said distribution buffer means and a domestic hot water circulation loop.

19. The system of claim 18 and further including means to provide supplemental heating of water in said domestic hot water circulation loop.

20. The system of claim 17 wherein said first and second fluid transfer circuits each includes a circulation loop and associated means for circulating said heat transfer fluid through its loop.

21. The system of claim 17 wherein said control means has one operating mode responsive to a relatively low temperature of fluid in said main storage means in which said heat pump circuit and said first circuit are operated concurrently to transfer thermal energy from said main storage means via said evaporator, and a second operating mode responsive to a relatively high temperature of the fluid in said main storage means in which said heat pump circuit and said second circuit are operated concurrently to transfer thermal energy to said main storage means via said condensor.

22. The system of claim 17 wherein said circulation control means has an operating mode responsive to an intermediate temperature of fluid in said main storage means for operating said heat pump circuit and said second fluid transfer circuit to transfer thermal energy from said collection buffer means to said main storage means via said evaporator side and condensor side circulation means and mass flow energy interchange between said distribution buffer means and said main storage means without operation of said first fluid transfer circuit.

23. The system of claim 22 and further including first temperature differential responsive means for actuating said first fluid transfer circuit in response to a predetermined temperature differential between the fluid in said collection buffer means and the fluid in said main storage means, and second temperature differential responsive means for actuating said first and second fluid transfer circuits in response to a predetermined temperature differential between the fluid in said distribution buffer means and the fluid in said collection buffer means.

* * * * *

UNITED STATES PATENT AND TRADEMARK OFFICE
CERTIFICATE OF CORRECTION

PATENT NO. : 4,527,618
DATED : July 9, 1985
INVENTOR(S) : Donald W. Fyfe, et al.

It is certified that error appears in the above-identified patent and that said Letters Patent are hereby corrected as shown below:

Col. 10, line 2, delete "support";

Col. 10, line 36, delete "interim";

Signed and Sealed this

Twenty-fourth Day of December 1985

[SEAL]

Attest:

DONALD J. QUIGG

Attesting Officer

Commissioner of Patents and Trademarks